US009886571B2

United States Patent
Caporale et al.

(10) Patent No.: US 9,886,571 B2
(45) Date of Patent: Feb. 6, 2018

(54) SECURITY ENHANCEMENT OF CUSTOMER REPLACEABLE UNIT MONITOR (CRUM)

(71) Applicant: XEROX CORPORATION, Norwalk, CT (US)

(72) Inventors: Christopher P. Caporale, Rochester, NY (US); Alberto Rodriguez, Webster, NY (US); Scott Jonathan Bell, Rochester, NY (US); John M. Scharr, Canandaigua, NY (US)

(73) Assignee: XEROX CORPORATION, Norwalk, CT (US)

( * ) Notice: Subject to any disclaimer, the term of this patent is extended or adjusted under 35 U.S.C. 154(b) by 141 days.

(21) Appl. No.: 15/044,406

(22) Filed: Feb. 16, 2016

(65) Prior Publication Data
US 2017/0235939 A1 Aug. 17, 2017

(51) Int. Cl.
*G06F 21/79* (2013.01)
*G06F 21/44* (2013.01)
*G06F 21/85* (2013.01)
*B41J 2/175* (2006.01)
*B41J 29/393* (2006.01)
(Continued)

(52) U.S. Cl.
CPC ............ *G06F 21/44* (2013.01); *B41J 2/1753* (2013.01); *B41J 2/17546* (2013.01); *B41J 29/393* (2013.01); *G06F 3/1239* (2013.01); *G06F 21/79* (2013.01); *G06F 21/85* (2013.01); *H04L 63/0876* (2013.01)

(58) Field of Classification Search
CPC .......... G06F 21/44; G06F 21/79; G06F 21/85; H04L 63/0876; B41J 2/1753; B41J 2/17546
See application file for complete search history.

(56) References Cited

U.S. PATENT DOCUMENTS 6,055,180 A    4/2000  Gudesen et al.
6,606,261 B2   8/2003  Gudesen et al.
(Continued)

FOREIGN PATENT DOCUMENTS

WO    WO2013000825 A1    1/2013

OTHER PUBLICATIONS

Author Unknown, "Thinfilm Memory Label for Brand Protection," Sales catalogue (2 pages), 2014.
Author Unknown, "Thinfilm NFC Barcode," Sales catalogue (2 pages), 2014.

*Primary Examiner* — Beemnet Dada
(74) *Attorney, Agent, or Firm* — MH2 Technology Law Group LLP

(57) ABSTRACT

A component subsystem and a method for authenticating the component subsystem. The component subsystem may be installed in a host device. The method can include an authentication protocol, wherein the host device sends a test voltage value to the component subsystem which, in turn, generates a test voltage based on the test voltage value. The test voltage is applied to a test cell that includes a wordline, a bitline, and a memory film. A response voltage is read from the bitline and compared to an expected value. If the response voltage matches the expected value, host device and/or component subsystem functionality is enabled. If the response voltage does not match the expected value, the host device and/or component subsystem functionality is disabled.

20 Claims, 5 Drawing Sheets

(51) Int. Cl.
    *G06F 3/12*     (2006.01)
    *H04L 29/06*    (2006.01)

(56)           References Cited

U.S. PATENT DOCUMENTS

| | | | |
|---|---|---|---|
| 6,667,919 B1* | 12/2003 | Ma | G11C 29/40 |
| | | | 365/201 |
| 6,787,825 B1 | 9/2004 | Gudesen et al. | |
| 6,788,563 B2 | 9/2004 | Thompson et al. | |
| 6,804,138 B2 | 10/2004 | Thompson et al. | |
| 6,878,980 B2 | 4/2005 | Gudesen et al. | |
| 6,937,500 B2 | 8/2005 | Gudesen et al. | |
| 6,950,330 B2 | 9/2005 | Thompson et al. | |
| 6,982,895 B2 | 1/2006 | Broms et al. | |
| 7,193,881 B2 | 3/2007 | Womack | |
| 7,345,906 B2 | 3/2008 | Karlsson et al. | |
| 8,184,467 B2 | 5/2012 | Broms et al. | |
| 2009/0285981 A1 | 11/2009 | Dyreklev et al. | |
| 2012/0182782 A1* | 7/2012 | Kurjanowicz | G11C 17/16 |
| | | | 365/94 |
| 2012/0275228 A1* | 11/2012 | Lu | G11C 16/0483 |
| | | | 365/185.18 |
| 2014/0210026 A1 | 7/2014 | Karlsson et al. | |
| 2014/0216791 A1 | 8/2014 | Karlsson et al. | |
| 2015/0146345 A1 | 5/2015 | Kamath et al. | |
| 2016/0087450 A1* | 3/2016 | Takahashi | B60L 11/182 |
| | | | 307/104 |

* cited by examiner

SECURITY ENHANCEMENT OF CUSTOMER REPLACEABLE UNIT MONITOR (CRUM)

TECHNICAL FIELD

The present teachings relate to the field of security, authentication, and anti-counterfeiting measures for customer-replaceable components in an electronic device such as a printer, copier, etc.

BACKGROUND

Modular designs of electronic devices such as printers, copiers, etc., allow for replacement of component or electronic subsystems by the end user. These component subsystems or "customer-replaceable unit monitors" (CRUMs) can include ink and toner cartridges, xerographic modules, fuser assemblies, as well as other electronic device subsystems. While end-user replacement of components is convenient and cost effective for the consumer, components that are not produced by the original equipment manufacturer (i.e., non-OEM components) or licensed suppliers may be of low quality, have problems with compatibility, and can create warranty issues with results that are unsatisfactory to a consumer.

In particular, substandard counterfeit components may, illegally, include manufacturer markings and trademarks that lead the consumer to believe the component is produced by an OEM. In addition to diverting sales revenues away from the OEM, early failure of the counterfeit component may result in decreased brand loyalty.

While a replaceable component may be manufactured by the OEM to include anti-counterfeiting measures, the revenue potential of counterfeit components is high and black market suppliers are increasingly sophisticated and well funded. Holographic markings and seals may be accurately recreated and encrypted electronic signatures can be broken, and thus have limited success in preventing copying of components. Security measures must be continually improved to ensure that customer-replaceable products remain protected from counterfeiting.

A new security measure that has improved resistance to copying and counterfeiting would be a welcome addition to the art.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an embodiment, a method for authenticating a component subsystem can include sending a test voltage value to the component subsystem, applying an input voltage to a test cell, wherein the input voltage is based on the test voltage value, reading a response voltage from the test cell, wherein the response voltage results from the input voltage applied to the test cell, comparing the response voltage to an expected output voltage, and enabling functionality of the component subsystem in response to the response voltage matching the expected output voltage.

In another embodiment, an electronic system can include a host device and a component subsystem installed in the host device. The component subsystem can include an authentication module configured to receive a test voltage value and to output a test voltage, and a test cell configured to receive the test voltage output by the authentication module, the test cell including a wordline, a read bitline, and a memory film, the memory film is interposed between the wordline and the bitline. The test cell may be configured to output a response voltage in response to receiving the test voltage. The electronic system can further include a host controller configured to compare the response voltage to an expected voltage based on the test voltage value.

In another embodiment, a printer can include a host device and a component subsystem installed in the host device. The he component subsystem can include an authentication module configured to receive a test voltage value and to output a test voltage, a test cell configured to receive the test voltage output by the authentication module, the test cell including a wordline, a bitline, and a memory film, the memory film is interposed between the wordline and the bitline. The test cell may be configured to output a response voltage in response to receiving the test voltage. The printer may further include a host controller configured to compare the response voltage to an expected voltage based on the test voltage value, and a housing that encases the component subsystem.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

As used herein, unless otherwise specified, the word "printer" encompasses any apparatus that performs a print outputting function for any purpose, such as a digital copier, bookmaking machine, facsimile machine, a multi-function machine, electrostatographic device, etc. Unless otherwise specified, the word "polymer" encompasses any one of a broad range of carbon-based compounds formed from longchain molecules including thermoset polyimides, thermoplastics, resins, polycarbonates, epoxies, and related compounds known to the art.

An embodiment of the present teachings may provide a security measure that is difficult to reproduce and provides a higher level of security than some conventional security measures. An embodiment may employ the use of a memory material such as a ferroelectric material or polymer material having a nonlinear response to an input voltage.

Figure 1:
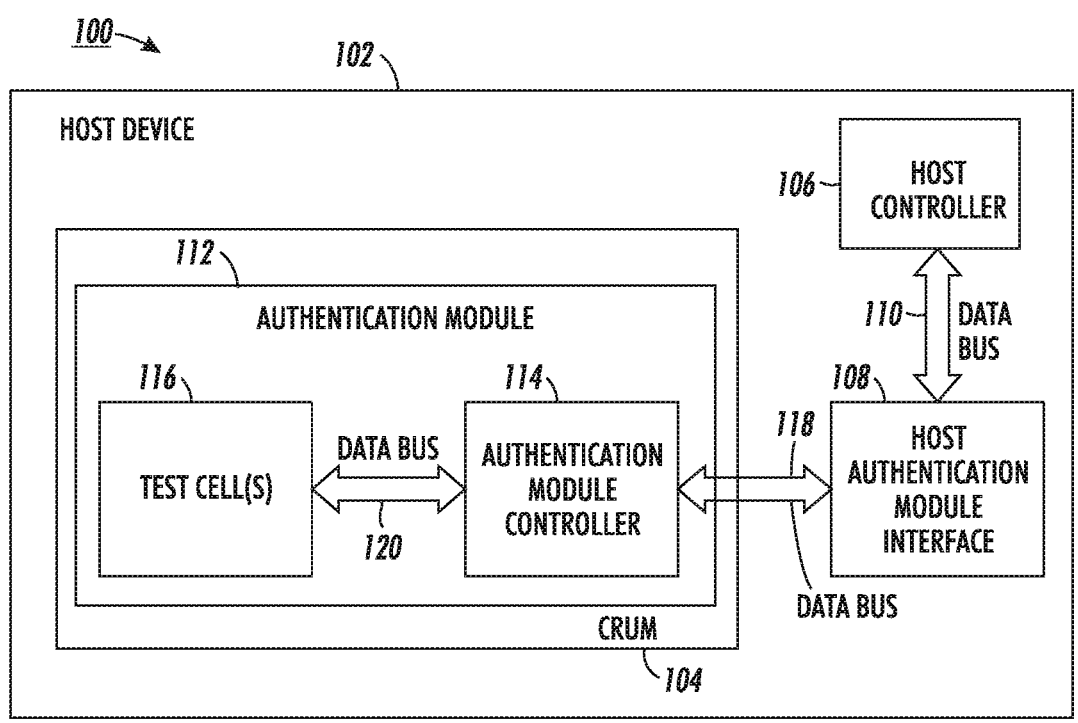
FIGS. 1 and 2 are block diagrams of an electronic system including a component subsystem in accordance with an embodiment of the present teachings.

FIG. 1 is a schematic depiction of an electronic system 100 in accordance with an embodiment of the present teachings. FIG. 1 depicts a host device 102 into which a CRUM 104 is installed. The host device 102 may include a host controller 106 in electrical communication with a host authentication module interface 108 via a first data bus 110. The CRUM 104 includes an authentication module 112 that is configured to include a security protocol described herein to ensure that the CRUM 104 is an authentic component subsystem and not a counterfeit component subsystem.

The authentication module 112 may include an authentication module controller 114 and one or more test cells (e.g., one or more memory cells) 116. The authentication module controller 114 may be in electrical communication with the host device 102 through a second data bus 118 that is in electrical communication with the host authentication module interface 108. The second data bus 118 may be, for example, a wired connection, including electrical contacts, and/or a wireless connection including a radiofrequency identification (RFID) device.

The test cells 116 may be in electrical communication with the authentication module controller 114 through a third data bus 120. While FIG. 1 depicts an overview of one possible electronic system 100 design, it will be appreciated that other designs may include other features that are not depicted, while depicted features may be removed or modified. Moreover, the overview of FIG. 1 is not intended to individually depict all supporting electronics such as microprocessors, memory, power supplies, etc., which may be designed into the present teachings by one of ordinary skill in the art.

Figure 2:
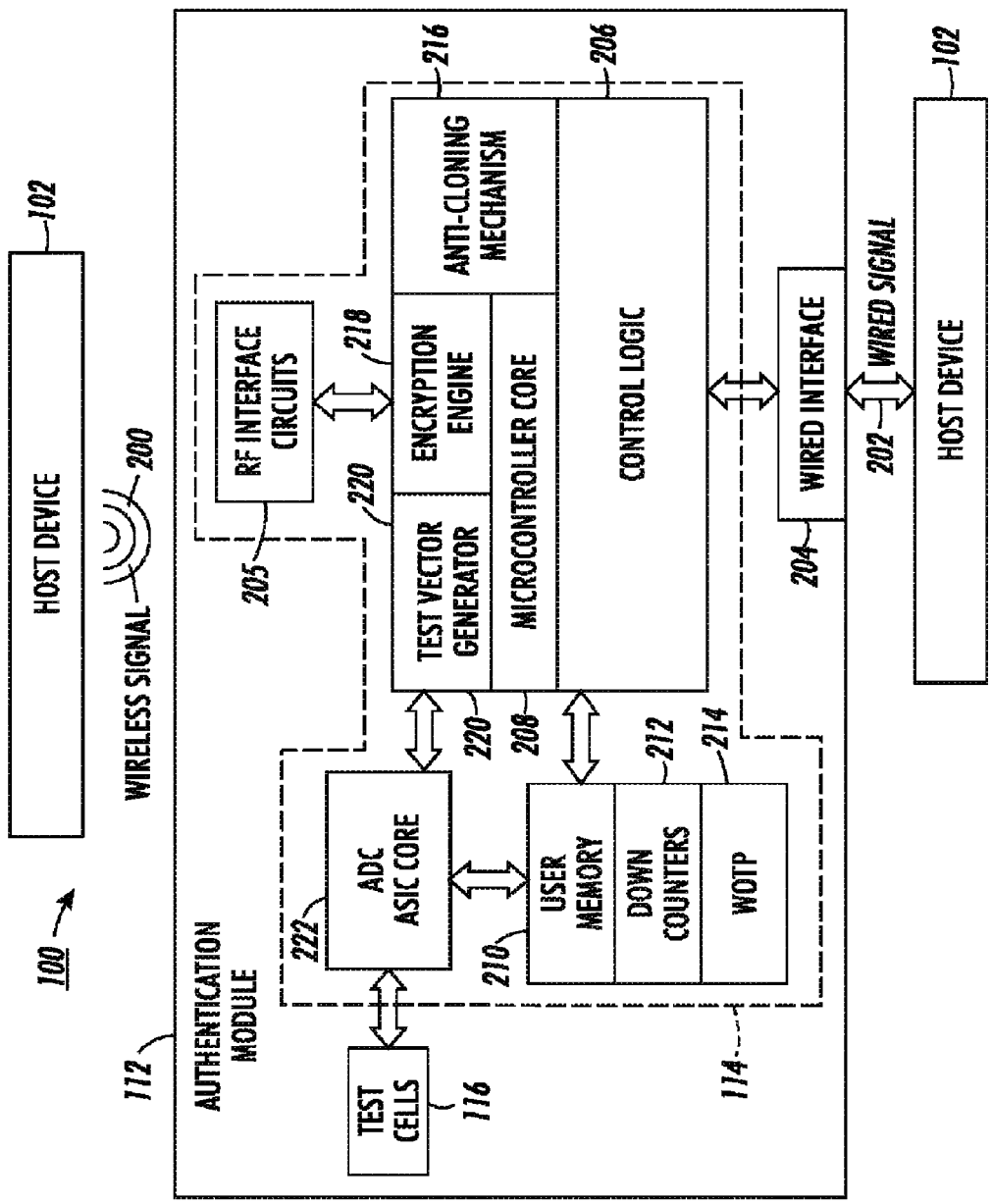

FIG. 2 depicts the electronic system 100 of FIG. 1, with emphasis on various subsystems of the authentication module 112. Two-way communication on the second data bus 118 between the host device 102 and the authentication module 112 installed within the host device 102 may be implemented using a wireless signal 200, where the second data bus 118 includes a wireless data bus 118. The wireless signal 200 may be implemented, for example, by a wireless interrogator in the host device 102 and a transponder in the CRUM 104. Two-way communication between the host device 102 and the authentication module 112 may also be performed through a wired signal 202 established, for example, by a CRUM wired interface 204 such as an electrical connector, plug, etc.

The authentication module controller 114 installed in the CRUM 104 includes control logic 206 that controls the operation of the authentication module 112, as well as other supporting electronics as depicted. The authentication module controller 114 includes a microcontroller core 208, for example a microprocessor, that performs logical and computational operations that support the authentication protocol. The control logic 206 may be in electrical communication with supporting hardware such as memory 210, for example volatile memory such as random access memory and non-volatile memory such as electrically erasable programmable read-only memory (EEPROM), down counters 212, and write-one-time programmable (WOTP) memory 214.

The authentication module controller 114 may also include an anti-cloning mechanism 216. The anti-cloning mechanism 216 may include a cryptographic algorithm that uses, for example, both static data and variable or unique data to generate encryption keys. The encryption keys may be exchanged between the host device 102 and the authentication module 112 of the CRUM 104 as a way of mutual authentication. The authentication module 112 may further include an encryption engine 218 for encrypting output from the CRUM 104 to the host device 102, and test vector generator 220 for generating test parameters that are output from the authentication module controller 114 to the test cells 116. Output from the authentication module controller 114 to the test cells may be an analog output. The test cells 116 may include one or more passive analog devices that respond with a non-linear output in response to different electrical (i.e., current and/or voltage, hereinafter, collectively, "voltage") input levels generated by an application-specific integrated circuit (ASIC) 222. In other words, the ferroelectric material of the test cells 116 creates a voltage hysteresis when comparing the test cell 116 input to the resulting test cell 116 output. In an embodiment, the input and output of the test cell 116 is a voltage, where the input is known and the resulting output is measured. An analog to digital converter (ADC) of the ASIC 222 digitizes a value of this hysteresis.

Power and ground may be supplied to the authentication module 112 through the wired interface 204. In addition to power and ground, the wired interface 204 may also include the second data bus 118 that is used to transfer electrical signals and data between the host device 102 and the CRUM 104, such that the wireless signal 200 is not required for this functionality. In other designs, the wired interface 204 may include power and ground, while the second data bus 118 includes a wireless signal 200 that transfers data between the host device 102 and the authentication module 112 using radiofrequency (RF) interface circuits 205.

Figure 3:
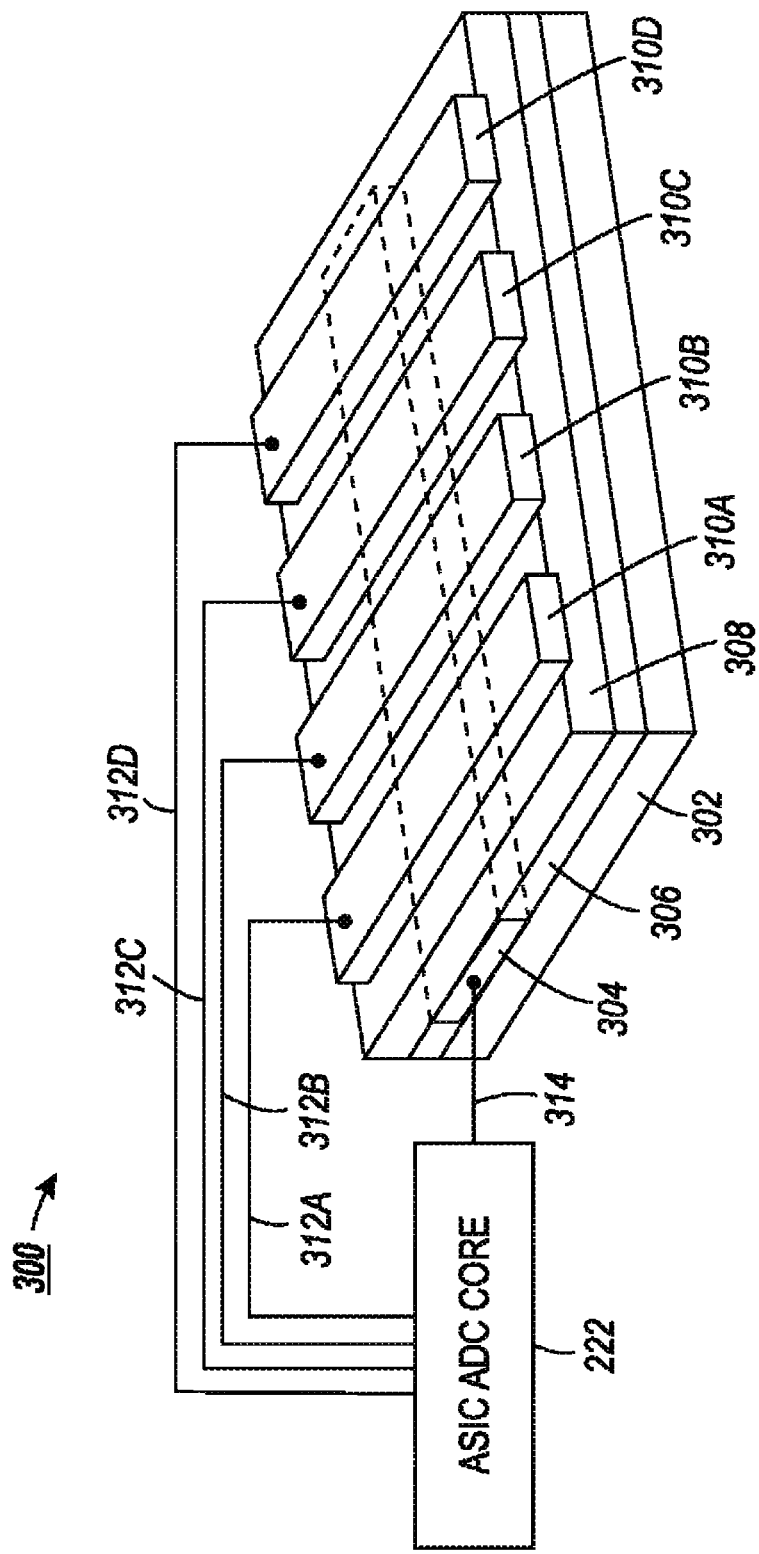
FIG. 3 is a schematic perspective depiction of a test structure including least one test cell that may be part of an array of test cells in accordance with an embodiment of the present teachings.

FIG. 3 is a schematic perspective depiction of a test structure 300 including a substrate 302 and a read electrode or bitline 304, for example, a buried bitline formed using a first patterned electrically conductive layer. The bitline 304 may be formed using a damascene process, photolithography, or another suitable process. The FIG. 3 structure may include a supporting dielectric layer 306 to provide a planar working surface. Subsequently, a memory film 308 is formed over the bitline 304, and one or more write electrodes or wordlines 310A-310D are formed over the memory film 308. The wordlines 310A-310D may be formed using a second patterned electrically conductive layer. While four wordlines and thus four test cells 116 (FIG. 1) are depicted in FIG. 3, the test structure 300 may include any number of wordlines, for example, one wordline for a test structure including only one test cell, or two or more wordlines to for a test structure including two or more test cells.

FIG. 3 further depicts a plurality of first address lines 312A-312D electrically coupled to the plurality of wordlines 310A-310D, and a second address line 314 electrically coupled to the bitline 304. The first address lines 312A-312D and the second address line 314 are routed to the ASIC ADC core 222 such that circuitry in the ASIC ADC core 222 can individually address each test cell. Each test cell 116 (FIG. 1) includes one of the wordlines 312, the bitline 304, and the memory film 308 at the intersection of the wordline 310 and the bitline 304. An electric charge may be thus written to, and read from, the memory film 308 for each test cell 116.

It will be understood that structures similar to those depicted in FIG. 3 may be formed at other substrate locations to simultaneously form a plurality of test cell structures that may be used to form a plurality of different CRUMs. Further, the test structure 300 of FIG. 3 may include other structures that are not depicted for simplicity while depicted structures may be removed or modified. For example, the bitline 304 may be formed over the wordlines 310, and the test structure 300 may include interconnects, conductive pads, etc., that allow for electrical contact with the wordlines 310 and bitline 304.

The patterned memory film 308 may provide a capacitor dielectric for each test cell. The memory film 308 may include, for example, a ferroelectric or electret polymer memory material. The memory film 308 may be selected as one or more of the following: viz. polyvinylidene fluoride (PVDF); polyvinylidene with any of its copolymers; terpolymers based on either copolymers or PVDF-trifluoroethylene (PVDF-TrFE); odd-numbered nylons; odd-numbered nylons with any of their copolymers; cyanopolymers; and cyanopolymers with any of their copolymers.

Thus the structure of FIG. 3 depicts a test structure 300 including one or more test cells as depicted. In FIG. 3, four test cells are depicted, wherein each test cell includes a wordline 310, a bitline 304, and a memory film (i.e., memory dielectric or capacitor dielectric) 308 at an intersection where the wordline 310 crosses the bitline 304. An electric charge may be written to, and read from, each test cell. The charge is stored on the memory film (i.e., memory dielectric or capacitor dielectric) 308 at the intersection of each wordline 310 and the bitline 304.

The same or different test voltages may be written to each of the plurality of test cells, then a current corresponding to the response voltage may be read from the plurality of test cells. In embodiments including a plurality of test cells, the current stored on each test cell may be read serially from each test cell, or the current from two or more test cells, including all of the test cells in the array of test cells, may be read simultaneously and used to determine the response voltage. It will be appreciated that a test structure 300 may include other structures that have not been depicted for simplicity, while various depicted structures may be removed or modified.

The test cell read and write operations will be described with reference to a test structure 300 including only one test cell, and the described operations may be modified as necessary and applied serially or in parallel if the test structure 300 includes a plurality of test cells.

During a write operation to the one or more test cells, a voltage pulse may be applied for a duration of time between the wordline 310 and the bitline 304 to place a charge on the memory film 308 positioned directly between the wordline 310 and the bitline 304. The polarity of the voltage pulse will determine the value or logical state written to the memory cell. The write voltage may be, for example, from about 7.0 volts (V) to about 24 V.

To read a current stored on a test cell as a result of a write operation, two separate voltage pulses may be applied between the wordline 310 and the bitline 304. Each voltage pulse may be applied for a duration of time, and may be separated by a delay. The two voltage pulses applied have a polarity relative to the wordline 310 and the bitline 304. The charge differential at the beginning and end of each pulse is measured then those two differentials are subtracted from each other. If the subtracted value is above a threshold, the charge value stored on the test cell is determined to equate to a zero value. If the subtracted value is below the threshold, the charge stored on the test cell is determined to be a "1". The initial applied voltage is potentially destructive and therefore if the first pulse returns a large charge differential the state of the memory was opposite that of the final value returned from the subtraction of the two differential values and in turn a third voltage pulse may be needed to restore the memory to its original state prior to the read sequence. During the read of the test cell, applying the voltage between the wordline 310 and the bitline 304 dumps the current stored on the test cell memory film onto the bitline, which is sensed or measured to determine the value of the stored current. The current from the bitline may be fed through a sense integrator and then to an ADC circuit (e.g., the ADC ASIC core 222).

In one method for authentication of a component subsystem, the CRUM 104 is installed into a host device 102, for example, by a user. After an initial installation of the CRUM 104, or anytime after the installation, the host device 102 may initiate an authentication request at a time determined by software or firmware of the host controller 106. In an embodiment, the host device 102 may be programmed to periodically initiate the authentication at regular or random intervals. The authentication request is passed from the host controller 106 to the host authentication module interface 108 via the first data bus 110.

The authentication request generated by the host controller 106 results in a selection of one or more test voltage values using a test value selection protocol within the host device 102 or within the host authentication module interface 108 that may select or randomize the test voltage values from a range of allowable test voltage values to be applied to the test cells 116 during the authentication. The range of allowable test voltage values may be initially determined during device design. The test voltage values are those that may be applied to the test cells 116 to result in an appropriate test cell response as described below. The authentication request and the one or more test voltage values are passed to the authentication module controller 114 of the authentication module 112 via the second data bus 118. In an embodiment, the second data bus 118 includes the wireless signal 200 that is output by the host device 102 and received by the RF interface circuits 205. In another embodiment, the second data bus 118 includes the wired signal 202 that is output by the host device 102 and received by the wired interface 204, or both the wired signal 202 and the wireless signal 200. In any case, the second data bus 118 is a two-way data bus.

Once the authentication module controller 114 receives the authentication request from the host authentication module interface 108, the authentication module controller 114 generates the test voltages based on the analog test voltage values received from the host device 102 and applies them to the test cell 116 through the bitline 304 and the wordline 310. The test voltages may be generated by the test vector generator 220 based on the test voltage values.

Depending on the test voltage applied to the memory film 308, the memory film 308 will conduct a response voltage to the bitline 304, which is read by the authentication module controller 114. The response voltage will depend on the specific material that is used for the memory film 308, as well as the method used to manufacture the memory film 308. While two different memory films 308 may have the same chemical composition, the electrical hysteresis of two materials will be different and therefore result in a different response voltage to the same input voltage if the memory films 308 were formed using different methods of manufacture. Thus the specific material used for the memory film 308 will react in a specific way to a particular input voltage along a non-linear response curve. An authentic CRUM that includes the specific material for the memory film 308 will respond to test voltage values supplied to the CRUM by the host device 102 in a specific way that is dependent on the specific memory film 308 as well as the method used to manufacture the memory film 308. A counterfeit CRUM is not likely to include the specific memory film 308 required for the correct response to the test voltage values supplied by the host device 102. Even if the memory film 308 is removed from an authentic CRUM and analyzed, it is not likely that its method of manufacture can be determined from chemical analysis or reverse engineering. While both the OEM and the non-OEM can quantify the hysteresis of the memory film 308 used on the test cells 116, the method of manufacture of the material is known only to the OEM. Thus the non-OEM is unable to manufacture a memory film 308 having the identical hysteresis that produces a correct output to the input from the host device 102, and the counterfeit nature of the CRUM can be determined thereby.

Once the test voltages have been applied to the test cells 116, the response voltages may be translated from an analog output to a digital output by the ADC circuitry within the ASIC core 222. The digitized signal can also be encrypted by the encryption engine to protect the data prior to transmission to the host. The response voltages are then sent to the host authentication module interface 108 by the CRUM 104 through the second data bus 118, then to the host controller 106 through the first data bus 110. The response voltages are then analyzed by the host controller 106 to determine whether the CRUM returned the correct response voltages in response to the test voltage values. If the correct or expected response voltages were returned (e.g., if the response voltages match the expected voltages), the controller 106 authenticates the CRUM 104 and enables functionality of the host device 102. If incorrect response voltages were returned (e.g., if the response voltages vary from the expected response voltages by more than an allowable tolerance), the controller 106 rejects the CRUM 104 and disables functionality of the host device 102 until an authentic CRUM 104 is installed and verified through the authentication process.

Figure 4:
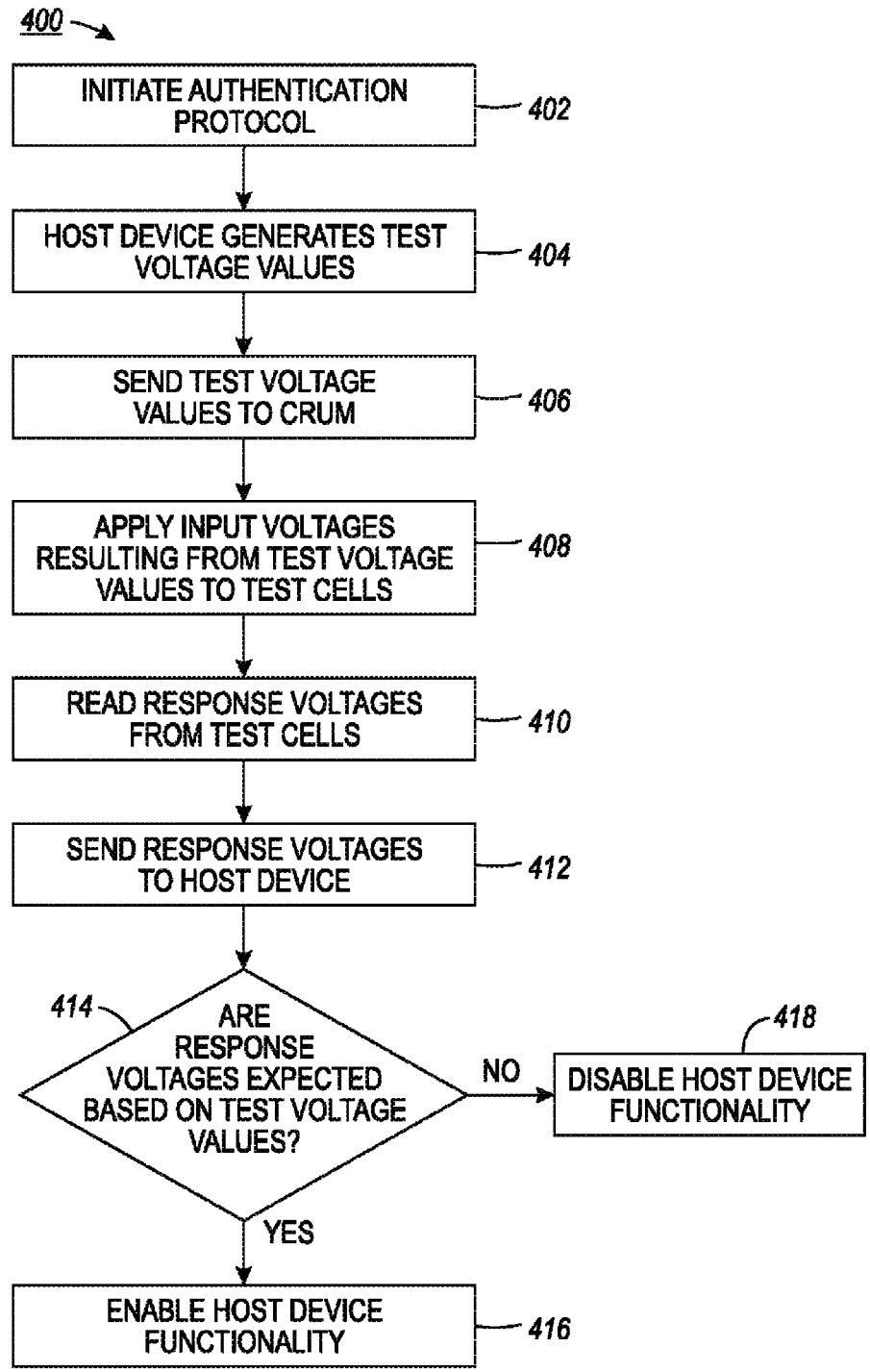
FIG. 4 is a flow chart depicting a method for authentication of a component subsystem in accordance with an embodiment of the present teachings.

FIG. 4 is a flow chart depicting an overview of one method 400 for authentication of a component subsystem such as a CRUM 104. At 402, an authentication protocol is initiated, for example, in response to installation of a CRUM into a host device. An authentication protocol may also be initiated at random or regular intervals. The authentication protocol will generally be initiated by the host device. After initiation of the authentication protocol 402, the host device generates test voltage values 404. The test voltage values may be randomly selected from a range of voltages that may be appropriately applied to the one or more test cells, and that will generate acceptable (e.g., repeatable and measurable) output from the test cells. At 406, the test voltage values are sent to the CRUM, which translates the test voltage values to test voltages, which are then applied to the test cells 408.

After applying the test voltages to the test cells, the response voltages from the test cells are read by the CRUM at 410, and sent to the host device at 412. The response voltages are analyzed by the host device 414, which may include comparing the response voltages returned from the CRUM to expected voltages based on the test voltage values. If the response voltages match the expected voltages, or are within a tolerance range of the expected voltages (i.e., there is a response voltage match), host device functionality and/or functionality of the CRUM is enabled 416. If the response voltages do not match the expected voltages (i.e., there is a response voltage mismatch), host device functionality and/or functionality of the CRUM is disabled 418.

To ensure that incorrect response voltages were not returned as a result of voltage fluctuations during testing, the authentication protocol 400 may be repeated a number of times.

During design of the test cells 116, several test patterns may be applied to the memory film in order to characterize the ferroelectric charge output response of the memory film over a range of applied input voltages. The measured output responses to the applied voltages may be used to generate a test response algorithm that generates an expected output to any test voltage input.

In another embodiment, the measured response voltages for all available test voltage input values may be stored as a lookup table. In this embodiment, a test voltage may be randomly or sequentially selected and applied to the test cells 116, and the measured test cell output in response to the test voltage is compared to the expected value from the lookup table.

During authentication, if the response value does not fall within expected limits, a flag may be generated to trigger an anti-cloning mechanism embedded within the authentication module. Both the characterization of the memory film and a cryptographic anti-cloning algorithm may be used to supplement each other.

The authentic CRUM 104 may be manufactured to include various security systems to hinder reverse engineering of the CRUM 104. For example, the authentication module controller 114 can include an encryption engine 218 to encrypt the response transferred by the CRUM 104 to the host device 102. Standard encryption such as the Advanced Encryption Standard (AES) or other encryption may be implemented in addition to the private key design described herein. Thus the second data bus 118 between the host device 102 and the CRUM 104 may carry encrypted data in both directions.

Additionally, the authentic CRUM 104 may include an anti-cloning mechanism 216. A cryptographic algorithm of the anti-cloning mechanism 216 may include the use of, for example, challenge response pairs from private keys, static and variable data within the host 102 and CRUM 104, random numbers, and other random data. The CRUM 104 may input this information into an algorithm to generate a numeric output. The host device 102 would, in turn, perform this same cryptographic function using the same data sent to the CRUM 104, then compare the result with the response generated by the CRUM 104 to determine the authenticity of the data.

It will be appreciated that, as used herein, the term "test voltage" refers to a voltage selected from a range of possible voltages that is applied to one or more test cells (i.e., memory cells) for a duration of time. Further, the term "response voltage" refers to an output value that represents the electron charge collected on the memory material of the one or more test cells during the application of the test voltage. In an embodiment, to read the response voltage from the memory material, the charge stored on the memory material during the application of the test voltage may be fed through an integrator which produces a charge signal. The charge signal is then amplified and fed into the ADC. The test cells store and return a specific charge which is characteristic of the memory material and varies for different memory materials, and further varies for memory materials with the same chemical formula produced using different manufacturing processes. The charge collected or stored in the memory material is converted to a signal that may be fed through an amplifier and converted to a digital output to be returned to the host and compared to an expected value to authenticate the CRUM. Inasmuch as the stored charge is dependent on the applied test voltage and the characteristics of the memory material, and is read from the memory cell after the application of the test voltage, the value that represents the stored charge that is read from the memory cell is referred to herein as a "response voltage."

Figure 5:
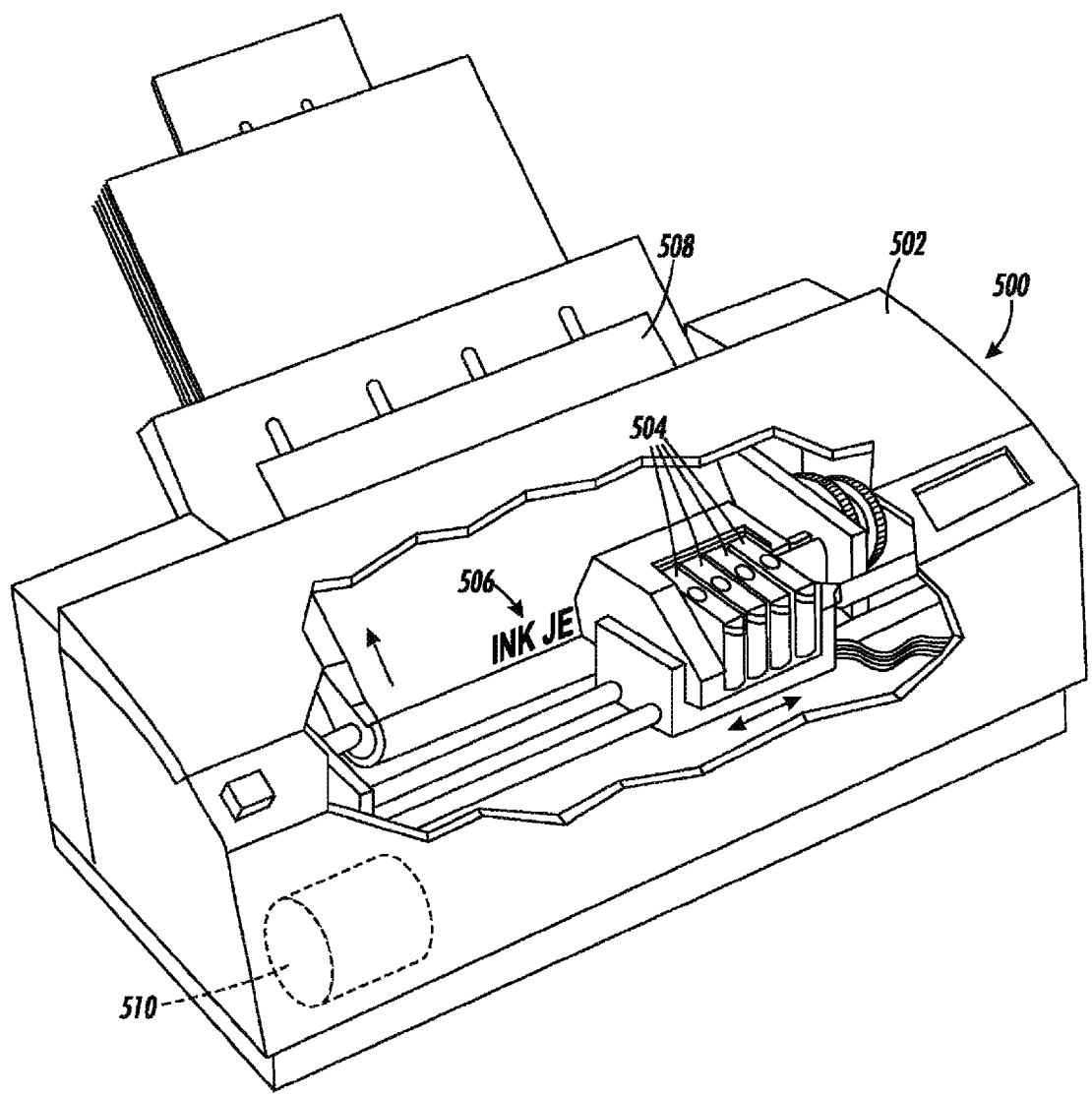
FIG. 5 is a perspective depiction of an electronic device such as a printer according to an embodiment of the present teachings.

FIG. 5 depicts a printer 500 including a printer housing 502 into which at least one structure such as at least one printhead 504 including an embodiment of the present teachings, for example a CRUM 104 (FIG. 1 similar to that depicted in FIG. 7, has been installed. The housing 502 may encase the printhead 504. During operation, ink 506 is ejected from one or more nozzles 74 in one or more printheads 504. The printhead 504 is operated in accordance with digital instructions to create a desired image on a print medium 508 such as a paper sheet, plastic, etc., using, for example, a print engine 510. The printhead 504 may move back and forth relative to the print medium 508 in a scanning motion to generate the printed image swath by swath. Alternately, the printhead 504 may be held fixed and the print medium 508 moved relative to it, creating an image as wide as the printhead 504 in a single pass. The printhead 504 can be narrower than, or as wide as, the print medium 508. In another embodiment, the printhead 504 can print to an intermediate surface such as a rotating drum or belt (not depicted for simplicity) for subsequent transfer to a print medium 508.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for authenticating a component subsystem, comprising:
   installing the component subsystem into a host device;
   selecting a test voltage value using a test value selection protocol within the host device;
   sending the test voltage value to the component subsystem from the host device;
   applying an input voltage to a test cell, wherein the input voltage is based on the test voltage value;
   reading a response voltage from the test cell, wherein the response voltage results from the input voltage applied to the test cell;
   sending the response voltage to the host device from the component subsystem;
   comparing the response voltage to an expected output voltage using a host controller within the host device; and
   enabling functionality of the component subsystem in response to the response voltage matching the expected output voltage.

2. The method of claim 1, further comprising disabling functionality of the component subsystem in response to the response voltage not matching the expected output voltage.

3. The method of claim 1, further comprising:
applying the input voltage to a memory film within the test cell, wherein the memory film is a material selected from the group consisting of viz. polyvinylidene fluoride, polyvinylidene with one or more polyvinylidene copolymers, a ter polymer based on a copolymer, a ter polymer based on PVDF-trifluoroethylene, an odd-numbered nylon, an odd-numbered nylon with any odd-numbered nylon copolymer, a cyanopolymer, and a cyanopolymer with a cyanopolymer copolymer.

4. The method of claim 1, further comprising:
sending the test value to the component subsystem from the host device using a first wireless signal on a wireless data bus; and
sending the response voltage to the host device from the component subsystem using a second wireless signal on the wireless data bus.

5. The method of claim 4, wherein the first wireless signal and the second wireless signal are encrypted.

6. The method of claim 1, wherein the host device is a printer and the component subsystem is one of an ink cartridge, a toner cartridge, a xerographic module, and a fuser assembly.

7. An electronic system, comprising:
a host device;
a component subsystem installed in the host device, wherein the component subsystem comprises:
an authentication module configured to receive a test voltage value and to output a test voltage; and
a test cell configured to receive the test voltage output by the authentication module, the test cell comprising a wordline, a bitline, and a memory film, the memory film is interposed between the wordline the bitline, wherein the test cell is configured to output a response voltage in response to receiving the test voltage; and
a host controller configured to compare the response voltage to an expected voltage based on the test voltage value.

8. The electronic system of claim 7, wherein the host controller is configured to disable functionality of the host device when the response voltage varies from the expected voltage by more than an allowable tolerance.

9. The electronic system of claim 8, wherein the host controller is configured to enable functionality of the host device when the response voltage matches the expected voltage.

10. The electronic system of claim 7, wherein the memory film is a material selected from the group consisting of viz. polyvinylidene fluoride, polyvinylidene with one or more polyvinylidene copolymers, a ter polymer based on a copolymer, a ter polymerbased on PVDF-trifluoroethylene, an odd-numbered nylon, an odd-numbered nylon with any odd-numbered nylon copolymer, a cyanopolymer, and a cyanopolymer with a cyanopolymer copolymer.

11. The electronic system of claim 7, further comprising a wireless data bus between the host device and the component subsystem, wherein the electronic system is configured to transmit the test voltage value from the host device to the component subsystem over the wireless data bus, and is further configured to transmit the response voltage from the component subsystem to the host device over the wireless data bus.

12. The component subsystem of claim 11, wherein the host device and the component subsystem are configured to output encrypted data on the wireless data bus.

13. A printer, comprising:
a host device;
a component subsystem installed in the host device, wherein the component subsystem comprises:
an authentication module configured to receive a test voltage value and to output a test voltage; and
a test cell configured to receive the test voltage output by the authentication module, the test cell comprising a wordline, a bitline, and a memory film, the memory film is interposed between the wordline and the bitline, wherein the test cell is configured to output a response voltage in response to receiving the test voltage;
a host controller configured to compare the response voltage to an expected voltage based on the test voltage value; and
a housing that encases the component subsystem.

14. The printer of claim 13, wherein the host controller is configured to disable functionality of the host device when the response voltage varies from the expected voltage by more than an allowable tolerance.

15. The printer of claim 14, wherein the host controller is configured to enable functionality of the host device when the response voltage matches the expected voltage.

16. The printer of claim 13, wherein the memory film is a material selected from the group consisting of viz. polyvinylidene fluoride, polyvinylidene with one or more polyvinylidene copolymers, a ter polymer based on a copolymer, a ter polymerbased on PVDF-trifluoroethylene, an odd-numbered nylon, an odd-numbered nylon with any odd-numbered nylon copolymer, a cyanopolymer, and a cyanopolymer with a cyanopolymer copolymer.

17. The printer of claim 13, further comprising a wireless data bus between the host device and the component subsystem, wherein the component subsystem is configured to transmit the test voltage value from the host device to the component subsystem over the wireless data bus, and is further configured to transmit the response voltage from the component subsystem to the host device over the wireless data bus.

18. The printer of claim 17, wherein the host device and the component subsystem are configured to output encrypted data on the wireless data bus.

19. The printer of claim 13, wherein the component subsystem is one of an ink cartridge, a toner cartridge, a xerographic module, and a fuser assembly.

20. The electronic system of claim 7, wherein:
the authentication module comprises an authentication module controller; and
the authentication module controller comprises an anti-cloning mechanism.

* * * * *